United States Patent [19]

Ong et al.

[11] Patent Number: 4,937,165

[45] Date of Patent: Jun. 26, 1990

[54] PHOTOCONDUCTIVE IMAGING MEMBERS WITH N,N-BIS(BIARYLYL)ANILINE CHARGE TRANSPORTPOLYMERS

[75] Inventors: Beng S. Ong, Mississauga; Barkev Keoshkerian, Thornhill; Giuseppa Baranyi, Mississauga, all of Canada

[73] Assignee: Xerox Corporation, Stamford, Conn.

[21] Appl. No.: 332,206

[22] Filed: Apr. 3, 1989

[51] Int. Cl.$^5$ .............................................. G03G 5/14
[52] U.S. Cl. ...................................................... 430/59
[58] Field of Search .................................... 430/59, 73

[56] References Cited

U.S. PATENT DOCUMENTS

| | | |
|---|---|---|
| 3,265,496 | 8/1966 | Fox et al. |
| 3,567,450 | 3/1971 | Brantly et al. |
| 3,658,520 | 4/1972 | Brantly et al. |
| 3,767,393 | 10/1973 | Fox. |
| 4,025,341 | 5/1977 | Rule. |
| 4,540,651 | 9/1985 | Fujimaki et al. ............... 430/72 |
| 4,606,988 | 8/1986 | Sasaki ............................. 430/59 |
| 4,725,518 | 2/1988 | Carmichael et al. ............ 430/58 |
| 4,769,302 | 9/1988 | Ueda .............................. 430/59 |
| 4,801,517 | 1/1989 | Frechet et al. ................. 430/59 |
| 4,806,443 | 2/1989 | Yanus et al. ................... 430/56 |
| 4,806,644 | 2/1989 | Yanus et al. ................... 430/56 |
| 4,835,081 | 5/1989 | Ong et al. ....................... 430/59 |
| 4,869,988 | 9/1989 | Ong et al. ....................... 430/59 |

Primary Examiner—Roland E. Martin
Attorney, Agent, or Firm—E. O. Palazlo

[57] ABSTRACT

A photoconductive imaging member comprised of a photogenerating layer, and a charge transport layer comprised of the N,N-bis(biarylyl)aniline charge transport polymers of the formula

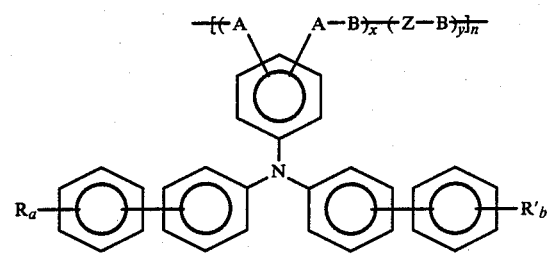

wherein A and B are independently selected from bifunctional linkages; Z is alkylenedioxy, arylenedioxy, or substituted derivatives thereof; R and R' are alkyl, aryl, alkoxy, aryloxy, or halogen; x and y are mole fractions wherein x is greater than 0 and the sum of x and y is equal to 1.0; a and b are the numbers 0, 1 or 2; and n represents the number of monomer units.

30 Claims, 1 Drawing Sheet

PHOTOCONDUCTIVE IMAGING MEMBERS WITH N,N-BIS(BIARYLYL)ANILINE CHARGE TRANSPORTPOLYMERS

BACKGROUND OF THE INVENTION

This invention is generally directed to photoconductive imaging members employing organic polymers as charge transport components. More specifically, the present invention is directed to layered imaging members with organic charge transport components selected, for example, from N,N-bis(biarylyl)aniline charge transport polymers. The aforementioned charge transport polymers possess a number of advantages including excellent charge transport properties; they are environmentally safe and non-toxic; and their synthesis easily executable by known synthetic processes. In addition, the charge transport polymers of the present invention can be utilized as a single-component transport layer, that is without the presence of a resin binder, in layered imaging devices. Single-component transport layers provide for long-term device, or imaging member stability in that they are devoid of the problem of small molecule crystallization commonly associated with the small molecule-in-binder transport layer counterparts. Furthermore, the charge transport polymers illustrated herein enable photoconductive imaging members that can be selected for electrophotographic imaging and printing processes for an extended number of imaging cycles, while substantially avoiding, or minimizing undesirable charge transport molecule crystallization. The imaging members of the present invention are especially suitable for imaging and printing apparatuses wherein liquid developers are selected since, for example, resin binders may be avoided thereby eliminating the problem of charge transport molecule leaching and bleeding when the said imaging members are in contact with liquid developers. Moreover, the charge transport polymers of the present invention possess good solubility in common organic solvents such as halogenated, especially chlorinated hydrocarbons, tetrahydrofuran, toluene, xylene, and the like, thus permitting improved coatability thereof by various processes such as spray, dip, and draw-down coating techniques. In one embodiment of the present invention the imaging member is comprised of a supporting substrate, a photogenerating layer, and in contact therewith a charge transport layer comprised of the N,N-bis(biarylyl)aniline charge transport polymer of the formulas illustrated herein. The charge transport layer can be located as the top layer of the imaging member, or alternatively it may be situated between the supporting substrate and the photogenerating layer.

The formation and development of electrostatic latent images on the imaging surfaces of photoconductive materials by electrostatic means is well known. Numerous different photoconductive members for use in xerography are known such as selenium, alloys of selenium, layered imaging members comprised of aryl amine charge transport layers, reference U.S. Pat. No. 4,265,990, and imaging members with charge transport layers comprised of polysilylenes, reference U.S. Pat. No. 4,618,551. The disclosures of the aforementioned patents are totally incorporated herein by reference. However, the layered imaging members with transport layers incorporating the N,N-bis(biarylyl)aniline polymers of the present invention are, for example, economically more attractive than, for example, the members of the '790 and '551 patents in respect of material and fabrication costs, and possess the other advantages illustrated herein. More specifically, the N,N-bis(biarylyl)aniline charge transport polymers of the present invention can be synthesized from readily available inexpensive starting materials via known synthetic processes. In terms of photochemical stability, the charge transport polymers of the present invention are superior to polysilylenes, and do not photodegrade when exposed to ultraviolet radiations.

There are also known photoreceptor materials comprised of other inorganic or organic materials wherein the charge carrier generation and charge carrier transport functions are accomplished by discrete contiguous layers. Additionally, photoreceptor materials are disclosed in the prior art which include an overcoating layer of an electrically insulating polymeric material, and in conjunction with this overcoated type photoreceptor there have been proposed a number of imaging methods.

Specifically, layered photoresponsive devices, including those comprised of photogenerating layers and transport layers, are disclosed in U.S. Pat. No. 4,265,990, and overcoated photoresponsive materials containing a hole injecting layer overcoated with a transport layer, followed by an overcoating of a photogenerating layer and a top coating of an insulating organic resin, reference U.S. Pat. No. 4,251,612. Examples of generating layers disclosed in these patents include trigonal selenium and vanadyl phthalocyanine, while examples of the charge transport layer that may be employed are comprised of the aryldiamines as mentioned therein. The '990 patent is of particular interest in that it discloses layered photoresponsive imaging members similar to those illustrated in the present application with the exception that the charge transporting component of the members of the present invention are comprised of charge transport polymers of the formulas illustrated herein. These members can be utilized in electrophotographic methods by, for example, initially charging the member with an electrostatic charge and imagewise exposing to form an electrostatic latent image which can be subsequently developed to form a visible image. Other representative patents disclosing layered photoresponsive devices include U.S. Pat. Nos. 4,115,116; 4,047,949 and 4,081,274.

As a result of a patentability search, there was located (1) U.S. Pat. No. 3,265,496, which discloses triarylamine photoconductive polymers derived from the reaction of functionalyzed vinyl polymers such as iodostyrene with diphenylamine, as described in column 3, lines 19 to 30 of the patent. At least three important differences exist between the polymers of the '496 patent and the polymers of the present invention: (a) the polymers of '496 patent are addition (vinyl) polymers derived by polymer modification of certain functionalized polymers with appropriate diarylamines; the present invention discloses polycondensation polymers which are obtained by polycondensation of appropriate monomers; (b) the '496 patent describes triarylamine polymers in which the triarylamine moieties are covalently linked to the polymer backbones via a single C—C bond; in the present invention, the N,N-bis(biarylyl)aniline charge transport moieties are covalently bonded to the polymer backbones via two C—O bonds; and (c) the polymers of the '496 patent are functionally photoconductive, whereas the polymers of the present invention are nonphotoconductive; they are employed as hole transport materials in layered imaging devices; (2) U.S. Pat. No. 4,725,518 which discloses a tertiary amine as a charge transport small molecule, see for example the formula when $R_1$ and $R_2$ are polyphenyl and $R_3$ is aryl; U.S. Pat. No. 3,767,393 which discloses alkylaminoaromatic photoconductors of the formula as illustrated in column 2($R_1$—N—$R_2$—Ar); and (3) 3,567,450; 3,658,520; 4,025,341; 4,540,651; 4,606,988 and 4,769,302. These patents (3) disclose the use of aromatic amine compounds either as hole transport small molecules or as photoconductive compositions, and are accordingly not believed to be similar to the present invention directed to the use of charge transport polymers based on N,N-bis(biarylyl)aniline in layered photoconductive devices.

There is also disclosed in Belgium Patent 763,540 an electrophotographic member having at least two electrically operative layers, the first layer comprising a photoconductive layer which is capable of photogenerating charge carriers, and injecting the photogenerated holes into an active layer containing a transport organic material which is substantially non-absorbing in the spectral region of intended use, but which is active and that allows injection of photogenerating holes from the photoconductive layer and allows these holes to be transported through the active layer. The active polymers may be mixed with inactive polymers or nonpolymeric materials. Also, there is disclosed in U.S. Pat. Nos. 4,232,102 and 4,233,383, the disclosures of which are totally incorporated herein by reference, the selection of sodium carbonate doped and barium carbonate doped photoresponsive imaging members containing trigonal selenium.

The following patent applications and U.S. patents are mentioned: (1) U.S. Pat. No. 4,818,650 describes layered imaging members with novel polymeric, hydroxy and alkoxy aryl amines, wherein m is a number of between about 4 and 1,000, reference for example Claims 1 and 2; (2) U.S. Ser. No. 061,247 (now abandoned) and U.S. Ser. No. 07/198,254 U.S. Pat. No. 4,871,634 illustrate imaging members with novel dihydroxy terminated aryl amine small molecules, reference Claims 1 and 2, for example; (3) U.S. Pat. No. 4,806,444, the disclosure of which is totally incorporated herein by reference, describes layered imaging members with novel polycarbonate polymeric aryl amines, reference Claims 1 and 2, for example; (4) U.S. Pat. No. 4,806,443, the disclosure of which is totally incorporated herein by reference, illustrates novel polycarbonate polymeric amines useful in layered imaging members, reference Claims 1 and 2, for example; and (5) U.S. Pat. No. 4,801,517, the disclosure of which is totally incorporated herein by reference, which discloses imaging members with novel polycarbonate aryl amines, reference Claims 1 and 2 for example.

In U.S. Pat. No. 4,869,988 and application U.S. Ser. No. 274,160 entitled, respectively, PHOTOCONDUCTIVE IMAGING MEMBERS WITH N,N-BIS(BIARYLYL)ANILINE, OR TRIS(BIARYLYL)AMINE CHARGE TRANSPORTING COMPONENTS, and PHOTOCONDUCTIVE IMAGING MEMBERS WITH BIARYLYL DIARYLAMINE CHARGE TRANSPORTING COMPONENTS, the disclosures of which are totally incorporated herein by reference, there are described layered photoconductive imaging members with transport layers incorporating biarylyl diarylamines, N,N-bis(biarylyl)anilines, and tris(biarylyl)amines as charge transport compounds. In the above-mentioned patent and application, there are disclosed improved layered photoconductive imaging members comprised of a supporting substrate, a photogenerating layer optionally dispersed in an inactive resinous binder, and in contact therewith a charge transport layer comprised of the above-mentioned charge transport compounds, or mixtures thereof dispersed in resinous binders.

Examples of specific charge transporting components disclosed in U.S. Pat. No. 4,869,988 include N,N-bis(4-biphenylyl)- 3,5-dimethoxyaniline (Ia); N,N-bis(4-biphenylyl)-3,5-dimethylaniline (Ib); N,N-bis(4-methyl-4'-biphenylyl)-3-methoxyaniline (Ic); N,N-bis(4-methyl-4'-biphenylyl)-3-chloroaniline (Id); N,N-bis(4-methyl-4'-biphenylyl)-4-ethylaniline (Ie); N,N-bis(4-chloro-4'-biphenylyl)-3-methylaniline (If); N,N-bis(4bromo-4'-biphenylyl)-3,5-dimethoxyaniline (Ig); 4-biphenylyl bis(4-ethoxycarbonyl-4'-biphenylyl)amine (IIa); 4-biphenylyl bis(4acetoxymethyl-4'-biphenylyl)amine (IIb); 3-biphenylyl bis(4-methyl-4'-biphenylyl)amine (IIc); 4-ethoxycarbonyl-4'-biphenylyl bis(4-methyl-4'-biphenylyl)amine (IId); and the like.

Examples of specific charge transporting compounds disclosed in application U.S. Ser. No. 274,160 include bis(p-tolyl)-4-biphenylylamine (IIa); bis(p-chlorophenyl)-4-biphenylylamine (IIb); N-phenyl-N-(4-biphenylyl)-p-toluidine (IIc); N-(4-biphenylyl)-N-(p-chlorophenyl)-p-toluidine (IId); N-phenyl-N-(4-biphenyl)-p-anisidine (IIe); bis(m-anisyl)-4-biphenylylamine (IIIa); (m-tolyl)-4-biphenylylamine (IIIb); bis(m-chlorophenyl) -4-biphenylylamine (IIIc); N-phenyl-N-(4-biphenylyl)-m-toluidine (IIId); N-phenyl-N-(4-bromo-4'-biphenylyl)-m-toluidine (IVa); diphenyl-4-methyl-4'-biphenylylamine (IVb); N-phenyl-N-(4-ethoxycarbonyl-4'-biphenylyl)-m-toluidine (IVc); N-phenyl-N-(4-methoxy-4'-biphenylyl)--m-toluidine (IVd); N-(m-anisyl)-N-(4-biphenylyl)-p-toluidine (IVe); bis(m-anisyl)-3-biphenylylamine (Va); N-phenyl-N-(4-methyl-3'-biphenylyl)-p-toluidine (Vb); N-phenyl-N-(4-methyl-3'-biphenylyl)-m-anisidine (Vc); bis(m-anisyl)-3-biphenylylamine (Vd); bis(p-tolyl)-4-methyl-3'-biphenylylamine (Ve); N-p-tolyl-N-(4-methoxy-3'-biphenylyl)-m-chloroaniline (Vf), and the like.

While imaging members with various charge transporting substances, including the aryl amines disclosed in the above patents, are suitable for their intended purposes, there continues to be a need for improved imaging members, particularly layered members, which are comprised of single-component transport layers based on charge transport polymers, thereby ensuring the long-term stability of the members. Another need resides in the provision of layered imaging members that are compatible with liquid developer compositions. Further, there continues to be a need for layered imaging members wherein the layers are sufficiently adhered to one another to allow the continuous use of such members in repetitive imaging systems. Also, there continues to be a need for improved layered imaging members whose transport layers are devoid of the problems of transport molecule crystallization, bleeding and leaching. Further, there continues to be a need for charge transporting polymers which are also useful as protective overcoating layers, and as interface materials for various imaging members. Furthermore there is a need for charge transport compounds or polymers that are nontoxic, and wherein such members are inert to the users thereof. A further need resides in the provision of novel efficient charge transport polymers which are readily accessible synthetically for inexpensive commercial starting materials.

SUMMARY OF THE INVENTION

It is therefore an object of the present invention to provide layered photoresponsive imaging members with many of the advantages indicated herein.

It is also an important object of the present invention to provide novel, efficient charge transport polymers which can function as single-component charge transport media, that is where a resin binder is avoided, for layered photoconductive imaging members.

It is yet another object of the present invention to provide improved layered photoresponsive imaging members with polymer charge transport layers in contact with a photogenerating layer, which members are suitable for use with liquid developers.

In a further object of the present invention there is provided an improved layered photoresponsive imaging member with a photogenerating layer situated between a supporting substrate, and a charge transport layer comprised of the charge transport polymers disclosed herein.

In yet another object of the present invention there is provided an improved photoresponsive imaging member comprised of a charge transporting polymer layer situated between a supporting substrate and a photogenerating layer.

In another object of the present invention there are provided imaging and printing methods with the layered imaging members disclosed herein.

Another object of the present invention resides in the provision of charge transport polymers which are non-toxic, and inert to the users of the devices within which they are incorporated.

A further object of the present invention is to provide improved layered imaging members which are devoid of the problems of transport molecule crystallization, bleeding and leaching, enabling their selection, for example, in imaging apparatuses with liquid developer compositions and which members are insensitive to changes in environmental conditions with the charge transport compounds described herein.

A further object of the present invention is to provide novel efficient charge transport polymers which are readily accessible by simple synthetic processes.

A further object of the present invention resides in the provision of improved layered imaging members comprised of charge transport polymers doped with (that is admixed with for example) charge transport small molecules enabling such devices to be utilized in high speed copying and printing processes.

These and other objects of the present invention are accomplished by the provision of layered imaging members comprised, for example, of a photogenerating layer and a charge transport layer comprised of N,N-bis(-biarylyl)aniline charge transport polymers. More specifically, the present invention is directed to layered imaging members comprised of photogenerating layers, and in contact therewith charge transport layers comprised of the N,N-bis(biarylyl)aniline polymers of Formula I as illustrated herein.

In one specific embodiment, the present invention is directed to a layered photoconductive imaging member comprised of a supporting substrate, a photogenerating layer comprised of organic or inorganic, photoconductive pigments optionally dispersed in an inactive resinous binder, and in contact therewith a charge transport layer comprised of an N,N-bis(biarylyl)aniline polymer, copolymer, or mixtures thereof represented by Formula I, optionally doped with a suitable charge transport compound, and/or optionally dispersed in a resin binder such as a polycarbonate

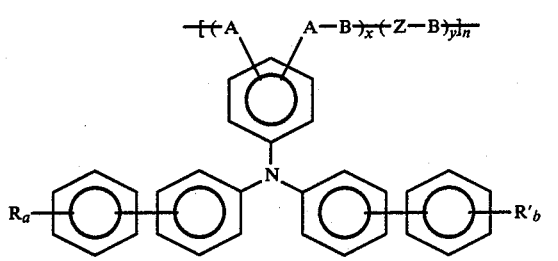

where A is a bifunctional linkage such as —O—, alkyleneoxy with from about 1 to about 20 carbon atoms such as —OCH$_2$—, —OCH$_2$CH$_2$—, OCH$_2$CH$_2$O— and the like; B is a bifunctional linkage such as CO—R'—CO—, —COO—R"—OCO—, —CONH—R'—NHCO—, wherein R" is an alkylene function with from about 1 to about 10 carbon atoms such as methylene, dimethylene, trimethylene, 3,3-dimethylpentamethylene, and the like, an arylene function with from about 6 to about 24 carbon atoms such as phenylene, phenylene, tolylene, anisylene, biphenylene, and the like, ether, or polyether segments, such as —CH$_2$CH$_2$OCH$_2$CH$_2$—, (CH$_2$CH$_2$O)$_2$CH$_2$CH$_2$—, —C$_6$H$_4$OC$_6$H$_4$— and the like; Z is alkylenedioxy, arylenedioxy or substituted derivative thereof with 1 to 24 carbon atoms such as 1,3-trimethylenedioxy, 1,4-tetramethylenedioxy, 1,6-hexamethylenedioxy, 1,4-phenylenedioxy bis(oxyphenyl)propane, bis(oxyphenyl)methane, bis(oxyphenyl)cyclopropane, and the like; R and R' are substituents such as alkyl, alkoxy, with 1 to about 25 carbon atoms such as methyl, ethyl, propyl, methoxy, ethoxy, propoxy, aryl, or aryloxy such as phenyl, tolyl, phenoxy, and the like, halogen such as chlorine, bromine, and the like; x and y are mole fractions with the provision that x is greater than 0, y can be 0, and that the sum of x and y is equal to 1.0; a and b are the numbers of 0, 1 or 2; and n is the number of monomer units ranging preferably from about 10 to about 300 or more.

Examples of alkyl and alkoxy groups as indicated herein include those with from 1 carbon atom to about 25 carbon atoms, and preferably from 1 carbon atom to about 10 carbon atoms, inclusive of methyl, methoxy, ethyl, ethoxy, propyl, propoxy, butyl, butoxy, pentyl, pentoxy, hexyl, octyl, octoxy, nonyl, nonoxy, decyl, decoxy, pentadecyl, searyl, and other similar substituents. Specific preferred alkyl and alkoxy groups are methyl, methoxy, ethyl, ethoxy, propyl, propoxy, butyl and butoxy. Aryl includes those groups with, for example, from 6 to about 24 carbon atoms such as phenyl and the like.

Examples of specific charge transporting polymers and copolymers include, but are not limited to, those of the following formulas, wherein n is as indicated herein

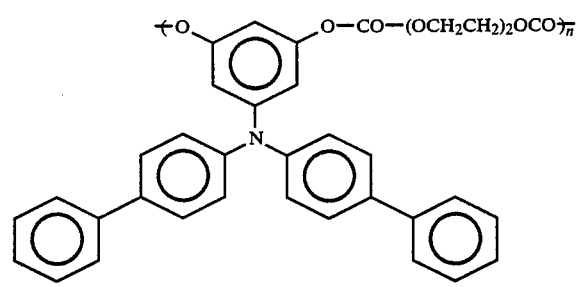
II
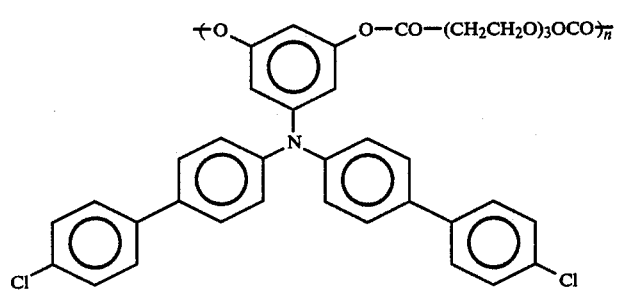
III
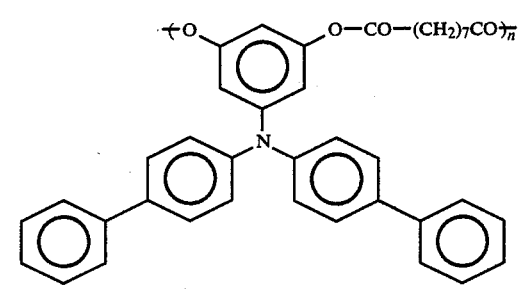
IV
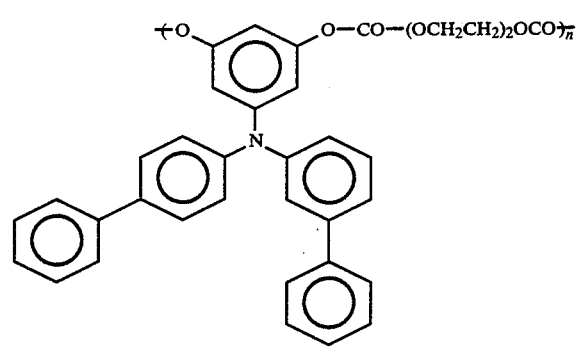
V
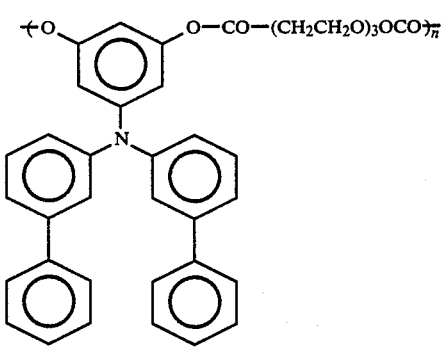
VI

-continued

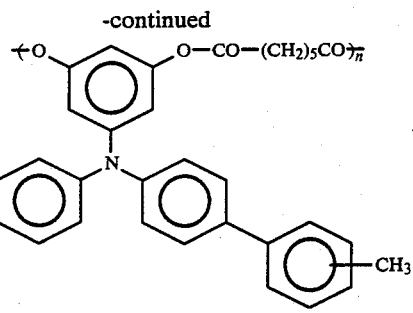 VII

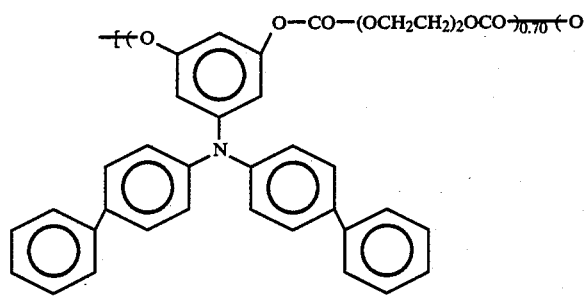 VIII

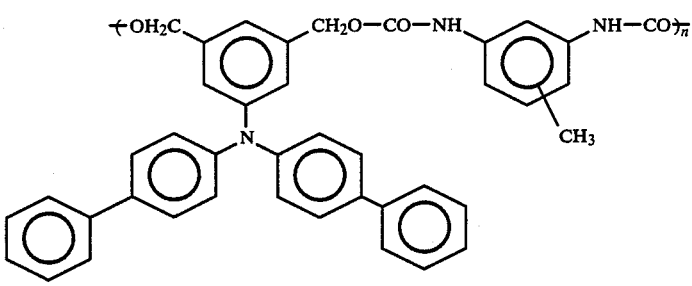 IX

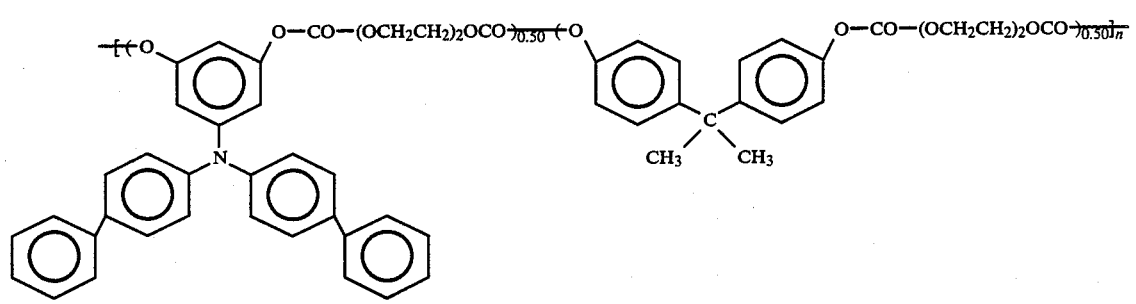 X

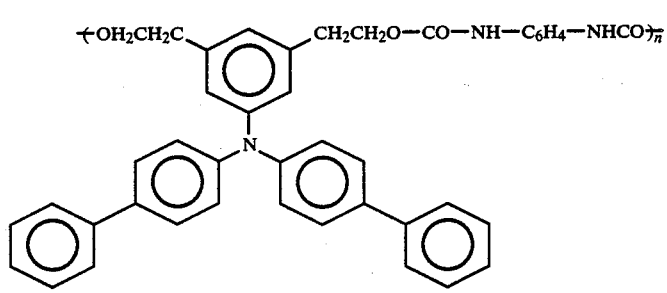 XI

The photoresponsive imaging members of the present invention can be prepared by a number of known methods, the process parameters and the order of the coating of the layers being dependent on the member desired. Thus, for example, the photoresponsive members of the present invention can be prepared by providing a conductive substrate with an optional charge blocking layer and an optional adhesive layer, and applying thereto a photogenerating layer, and overcoating thereon a charge transport layer of the N,N-bis(-biarylyl)aniline charge transport polymer illustrated herein, optionally doped with charge transport molecules. The improved photoresponsive imaging members of the present invention can be fabricated by common known coating techniques such as by dip coating, drawdown coating, or by spray coating process, depending largely on the type of imaging devices desired. Each coating, however, can be usually dried, for example, in a convection or forced air oven at a suitable temperature before a subsequent layer is applied thereto.

DETAILED DESCRIPTION OF THE INVENTION

Figure 1:
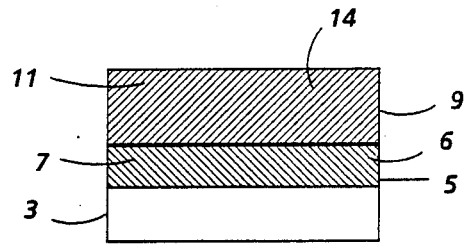
FIG. 1 represents a partially schematic cross-sectional view of a photoresponsive imaging member of the present invention.

Illustrated in FIG. 1 is a photoresponsive imaging member of the present invention comprising a supporting substrate 3 of a thickness of 50 microns to about 5,000 microns, a charge carrier photogenerating layer 5 of thickness of 0.5 micron to 5 microns comprised of a photogenerating pigment 6 optionally dispersed in inactive resinous binder composition 7, and a charge transport layer 9 of a thickness of 10 microns to 60 microns comprised of N,N-bis(biarylyl)aniline polymers, preferably of the Formulas II, III, IV, VIII, X, and XI as illustrated herein as a charge transporting substance 11 optionally doped with a suitable charge transport molecule 14, such as N,N-bis(4-biphenylyl)-3,5-dimethoxyaniline or N,N-bis(4-biphenylyl)-3,5-dimethylaniline in the amount of 1 percent to about 20 percent by weight. In an alternative embodiment of the persent invention, and in further regard to FIG. 1, the charge transporting layer can be situated between the supporting substrate and the photogenerating layer.

Figure 2:
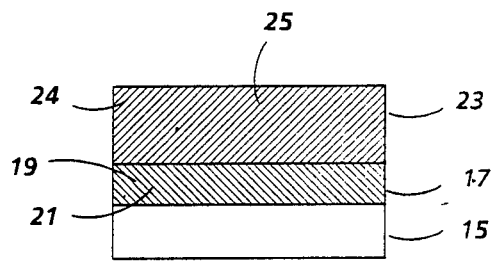
FIGS. 2 and 3 represent partially schematic cross-sectional views of preferred photoresponsive imaging members of the present invention.

Illustrated in FIG. 2 is a photoresponsive imaging member of the present invention comprised of a 25 micron to about 100 micron thick conductive supporting substrate 15 of aluminized Mylar, a 0.5 micron to about 5 micron thick photogenerating layer 17 comprised of trigonal selenium photogenerating pigments 19, optionally dispersed in a resinous binder 21 in the amount of 10 percent to about 80 percent by weight, and a 10 micron to about 60 micron thick charge transport layer 23, comprised of the charge transport polycarbonate 24 of Formula II, the charge transport polycarbonate (III), the charge transport polyester (IV), the charge transport copolycarbonate (VIII), the charge transport copolycarbonate (X), or the charge transport polyurethane (XI) optionally doped with the charge transport molecule 25 such as N,N-bis(4-biphenylyl)-3,5-dimethoxyaniline in the amount of 1 percent to about 20 percent by weight.

Figure 3:
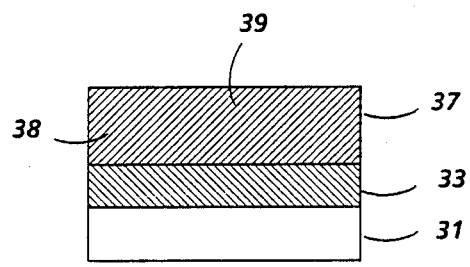

Another photoresponsive imaging member of the present invention, reference FIG. 3, is comprised of a conductive supporting substrate 31 of aluminum of a thickness of 50 microns to about 5,000 microns, a photogenerating layer 33 comprised of amorphous selenium or amorphous selenium alloy, especially selenium arsenic (99.5/0.5) and selenium tellurium (75/25), of a thickness of 0.1 micron to about 5 microns, and a 10 micron to about 60 micron thick charge transport layer 37 comprised of charge transport polycarbonate 38 of Formula II, the charge transport polycarbonate (III), the charge transport polyester (IV), the charge transport copolycarbonate (VIII), the charge transport co-polycarbonate (X), the charge transport polyurethane (XI) optionally doped with the charge transport molecule 39, such as N,N-bis(4-biphenylyl)-3,5-dimethoxyaniline in the amount of 1 percent to about 20 percent by weight.

Figure 4:
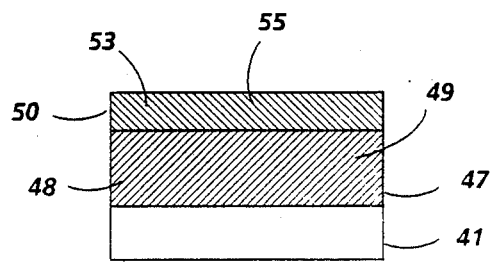
FIG. 4 represents a partially schematic cross-sectional view of a photoresponsive imaging member of the present invention wherein the charge transporting layer is situated between a supporting substrate, and the photogenerating layer.

Illustrated in FIG. 4 is another photoresponsive imaging member of the present invention comprised of a 25 micron to 100 microns thick conductive supporting substrate 41 of aluminized Mylar, a 10 micron to about 60 micron thick charge transport layer 47 comprised of a charge transport polycarbonate 48 of Formula II, the charge transport polycarbonate (III), the charge transport polyester (IV), the charge transport copolycarbonate (VIII), or the charge transport copolyurethane (X) optionally doped with 1 percent to about 20 percent by weight of a suitable charge transport molecule 49, such as N,N-bis(4-biphenylyl)-3,5-dimethoxyaniline and a 0.1 micron to about 5 micron thick photogenerating layer 50 comprised of vanadyl phthalocyanine photogenerating pigments 53 optionally dispersed in a polyester resinous binder 55 in the amount of 10 percent to about 80 percent by weight.

The supporting substrate layers, may be opaque or substantially transparent and may comprise any suitable material having the requisite mechanical properties. The substrate may comprise a layer of an organic or inorganic material having a conductive surface layer arranged thereon or a conductive material such as, for example, aluminum, chromium, nickel, indium, tin oxide, brass or the like. The substrate may be flexible or rigid and can have any of many different configurations such as, for example, a plate, a cylindrical drum, a scroll and the like. The thickness of the substrate layer is dependent on many factors including, for example, the components of the other layers, and the like; generally, however, the substrate is of a thickness of from about 50 microns to about 5,000 microns.

Examples of preferred photogenerating layers, especially since they permit imaging members with a photoresponse of from about 400 to about 700 nanometers, for example, include those comprised of known photoconductive charge carrier generating materials, such as amorphous selenium alloys, halogen doped amorphous selenium, halogen doped amorphous selenium alloys, trigonal selenium, mixtures of Groups IA and IIA, elements, selenite and carbonates with trigonal selenium, reference U.S. Pat. Nos. 4,232,102 and 4,233,283, the disclosures of each of these patents being totally incorporated herein by reference, copper, and chlorine doped cadmium sulfide, cadmium selenide and cadmium sulfur selenide and the like. Examples of specific alloys include selenium arsenic with from about 95 to about 99.8 weight percent selenium; selenium tellurium with from about 70 to about 90 weight percent of selenium; the aforementioned alloys containing halogens such as chlorine in amounts of from about 100 to about 1,000 parts per million; ternary alloys, and the like. The thickness of this photogenerating layer is dependent on a number of factors, such as the materials included in the other layers, and the like; generally, however, this layer is of a thickness of from about 0.1 micron to about 5 microns, and preferably from about 0.2 microns to about 2 microns, depending on the photoconductive volume loading, which may vary from about 5 percent to about 100 percent by weight. Generally, it is desirable to provide this layer in a thickness which is sufficient to absorb about 90 percent or more of the incident radiation which is directed upon it in the imagewise exposure step. The maximum thickness of this layer is dependent primarily upon factors such as mechanical considerations, for example, whether a flexible photoresponsive device is desired. Also there may be selected as photogenerators provided the objectives of the present invention are achieved, organic components such as squaraines, perylenes, reference for example U.S. Pat. No. 4,587,189, the disclosure of which is totally incorporated herein by reference, metal phthalocyanines, metal free phthalocyanines, vanadyl phthalocyanine, dibromoanthanthrone, and the like.

The transport layer is usually comprised of one of the charge transport polymers illustrated herein, which may optionally be doped with a suitable charge transport molecules primarily to further enhance the photosensitivity of the imaging members for very high speed copying and printing applications. The dopants, examples of which include N,N-bis(4-biphenylyl)-3,5-dimethoxyaniline, N,N-bis(4-biphenylyl)-3,5-dimethylaniline, N,N-bis(4-methyl-4'-biphenylyl)-3-methoxyaniline, N,N-bis(4-methyl-4'-biphenylyl)-3-chloroaniline, N,N-bis(4-biphenylyl)-p-toluidine, N,N-bis(4-biphenylyl)-m-toluidine, N,N-bis(4-biphenylyl)-3-anisidine, and the like, when selected, may be present in an amount of from about 1 to about 50 percent by weight, and preferably from about 5 percent to about 20 percent by weight. The thickness of the charge transport layer is, for example, from about 5 microns to about 50 microns with the thickness depending predominantly on the nature of intended applications. In addition, a layer of adhesive material located, for example, between the transport layer and the photogenerating layer to promote adhesion thereof can be utilized. This layer may be comprised of known adhesive materials such as polyester resins, reference 49,000 polyester available from Goodyear Chemical Company, polysiloxane, acrylic polymers, and the like. A thickness of from about 0.001 micron to about 0.1 micron for this layer is generally employed for the adhesive layer. Hole blocking layers usually situated between the substrate and the photogenerating layer such as those derived from polycondensation of aminopropyl trialkoxysilane or aminobutyl trialkoxysilane, such as 3-aminopropyltrimethoxysilane, 3-aminopropyltriethoxysilane, or 4-aminobutyltrimethoxysilane may optionally be introduced to improve the dark decay characteristics of the imaging member. Typically, this layer has a thickness of from about 0.001 micron to about 5 microns or more in thickness, depending on the effectiveness with which this layer prevents the dark injection of charge carriers into the photogenerating layer.

The charge transporting N,N-bis(biarylyl)aniline polymers or copolymers of the present invention can be readily synthesized from the corresponding bifunctionalized monomers such as the corresponding dihydroxy derivatives by polycondensation with suitable bifunctional reagents. The latter can be selected from the group consisting of diacyl halide such as succinyl chloride, adipoyl chloride or azelaoyl chloride, bishaloformates such as ethylene glycol bischloroformate, propylene glycol bischloroformate, or diethylene glycol bischloroformate, and diisocyanates such as hexane diisocyanate, benzene diisocyanate or toluene diisocyanate. Also, the charge transport copolymers of the present invention can be obtained by copolymerization, for example, with suitable dihydroxy comonomers such as bisphenol A, bisphenol Z, and other similar diols. For the charge transport polyesters and polycarbonates, the polymerization is conducted in an inert atmosphere at temperatures ranging from about 0° C. to about 40° C., and preferably from 10° C. to about 30° C. in the presence of an excess organic base such as triethylamine, and the like. Typically, a slight excess of bishaloformate or diacyl chloride is employed to compensate for the propensity of the reagent to undergo hydrolysis, and a 2 to about 10 fold excess of the base is utilized. The polycondensation is executed in a suitable solvent such as methylene chloride, ethyl acetate and the like. For the charge transport polyurethanes, the reaction is accomplished with or without a catalyst in a suitable solvent such as dimethylsulfoxide, dimethylformamide, and the like, at temperatures ranging from ambient to about 80° C. The catalyst of choice for polyurethane preparation is di-n-butyltin dilaurate, although other catalysts such as di-n-butyltin sulfite, tri-n-butyltin acetate, ferric acetyl acetonate, triethylenediamine, triethylamine, and the like, can also be chosen.

The layered imaging members incorporating the charge transport polymers of the present invention exhibit excellent charge transport properties, and possess very low dark decay characteristics. Also, the charge transport polymers of the present invention can be utilized as single component charge transport layers, thereby ensuring the long-term stability of transport layers. Imaging members with single-component transport layers are especially suitable for use with liquid developer compositions without the problem of crystallization, bleeding or leaching of transport small molecules. As the transport layer of the present invention is transparent to the visible light, all the visible radiation used in the exposure penetrates to the photogenerating layer without noticeable loss. The imaging members of the present invention possess good photosensitivity and are generally good photosensitive imaging devices or members.

The following examples are being supplied to further define specific embodiments of the present invention, it being noted that these examples are intended to illustrate and not limit the scope of the present invention. Also, parts and percentages are by weight unless otherwise indicated.

EXAMPLE I

Synthesis of
N,N-Bis(4-biphenylyl)-3,5-Dihydroxyaniline

A mixture of 28.0 grams of 4-iodobiphenyl, 4.1 grams of copper bronze powder, and 20.0 grams of potassium carbonate in 100 milliliters of Soltrol 220 was mechanically stirred in a round-bottomed flask under a nitrogen atmosphere. The mixture was heated with a heating mantle, and when the temperature reached 150° C., 7.65 grams of 3,5-dimethoxyaniline was added. The reaction mixture was subsequently heated under reflux at 220° C., and the progress of the reaction was monitored by thin layer chromatography. After five hours, the reaction mixture was filtered, and the filtrate was evaporated under reduced pressure to remove Soltrol 220. Purification of the brown residue by column chromatography on silica gel using a mixture of hexane and tetrahydrofuran (1:9) as the eluent afforded a light yellow solid which was recrystallized from isopropanol to afford 11.5 grams of the pure product N,N-bis(biphenylyl)-3,5-dimethoxyaniline, melting point 79° C. to 80° C.

$^1$H NMR (CDCl$_3$), δ(ppm): 3.7 (s, 6H); 6.2 (t, J$_m$=2.0 Hz; 1H); 6.35 (d, J$_m$=2.0 Hz; 2H); 7.1 to 7.7 (m, 18H).

Elemental Analysis, Calculated for C$_{32}$H$_{27}$NO$_2$: C, 84.00; H, 5.95; N, 3.06. Found: C, 84.11; H, 5.73; N, 3.24.

A mixture of 7.30 grams of N,N-bis(biphenylyl)-3,5-dimethoxyaniline as obtained above, and 14.5 grams of sodium iodide in 30 milliliters of sulfolane was mechanically stirred and heated under reflux at 120° C. in a round-bottomed flask for 15 minutes. The mixture was then cooled to about 70° C., and 0.25 milliliter of water was added. This was followed by the addition of 13 milliliters of chlorotrimethylsilane over a period of 15 minutes. The resulting mixture was heated for another 3.5 hours before pouring carefully into 600 milliliters of cold water with stirring. The crude product was isolated, dried, and purified by column chromatography on silica gel using a 1:50 mixture of acetone and methylene chloride as an eluent. The yield of pure bis(m-hydroxyphenyl)-4-biphenylylamine was 5.30 grams, melting point, 132° C. to 134° C.

$^1$H-NMR (CDCl$_3$), δ(ppm): 4.6 (br s, 2H); 6.05 (t, 1H); 6.2 (d, 2H); 7.1 to 7.6 (m, 18H).

Elemental Analysis, Calculated for C$_{30}$H$_{23}$NO$_2$: C, 83.89; H, 5.40; N, 3.26. Found: C, 83.55; H, 5.32; N, 4.14.

EXAMPLE II

Synthesis of Polycarbonate (II)

3.87 grams of N,N-bis(biphenylyl)-3,5-dihydroxyaniline as obtained in Example I were dissolved in a mixture of 8.0 milliliters of methylene chloride and 3.5 milliliters of triethylamine in a round-bottomed flask under a nitrogen atmosphere. The resulting solution was cooled to about 15° C., and a solution of 2.15 grams of diethylene glycol bischloroformate in 1.5 milliliters of methylene chloride was added dropwise over a period of 20 minutes. After addition, the reaction mixture was stirred at room temperature for 4 hours before 2 milliliters of absolute ethanol and 1 milliliter of triethylamine were added. After stirring for another 1 hour, the reaction mixture was evaporated to dryness under reduced pressure. The residue was dissolved in 50 milliliters of methylene chloride, and the solution was washed twice with saturated aqueous sodium bicarbonate solution and three times with water. The solution was then dried, and concentrated to about 10 milliliters in volume. Precipitation from 500 milliliters of swirling methanol at room temperature afforded a white solid polymer. Further purification was accomplished by repeating the aforementioned precipitation. The yield of pure polycarbonate (II) was 4.55 grams, and its number average molecular weight was 15,500 (relative to polystyrene standard).

IR (neat film): 1,760 cm$^{-1}$.

$^1$H-NMR (CDCl$_3$), δ(ppm): 3.75 (br, 4H); 4.35 (br, 4H); 6.7 to 6.9 (m, 3H); 7.1 to 7.7 (m, 18H).

EXAMPLE III

Synthesis of Polyester (IV)

The preparation of polyester (IV) was accomplished in accordance with the procedure of Example II except that 2.03 grams of freshly distilled azelaoyl chloride was used instead of diethylene glycol bischloroformate. In addition, the polymerization was effected for 10 hours instead of 4 hours. The yield of polyester (IV) was 3.80 grams, and its number average molecular weight was 21,000.

IR (neat film): 1,745 cm$^{-1}$.

$^1$H-NMR (CDCl$_3$), δ(ppm): 1.3 (br, 6H); 1.7 (br, 4H); 2.5 (t, 4H); 6.7 to 6.9 (m, 3H); 7.1 to 7.7 (m, 18H).

EXAMPLE IV

Synthesis of Copolycarbonate (X; x=y=0.5)

The preparation of copolycarbonate (X) was executed in accordance with the procedure of Example II except that a mixture of 1.935 grams of N,N-bis(biphenylyl)-3,5-dihydroxyaniline and 1.026 grams of 2,2-bis(p-hydroxyphenyl)propane was employed in place of 3.87 grams of N,N-bis(biphenylyl)-3,5-dihydroxyaniline. The yield of copolycarbonate (X) was 3.60 grams, and its number average molecular weight was 18,000.

IR (neat film): 1760 cm$^{-1}$.

$^1$H MNR: 1.7 (s, 3H); 3.7 (br, 4H); 4.3 (br, 4H); 6.7 to 7.7 (m, 14.5H).

EXAMPLE V

A photoresponsive imaging member was prepared by providing an aluminized Mylar substrate in a thickness of 75 microns, followed by applying thereto with a multiple-clearance film applicator a solution of N-methyl-3-aminopropyl-trimethoxysilane (from PCR Research Chemicals) in ethanol (1:20 volume ratio). This layer, 0.1 micron, was dried for 5 minutes at room temperature, and then cured for 10 minutes at 110° C. in a forced air oven. There was then applied to this silane layer a solution of 0.5 percent by weight of 49,000 polyester (Dupont Chemical) in a mixture of methylene chloride and 1,1,2-trichloroethane (4:1 volume ratio) with a multiple-clearance film applicator. The layer was allowed to dry for one minute at room temperature, and 10 minutes at 100° C. in a forced air oven. The resulting adhesive layer had a dry thickness of 0.05 micron.

A dispersion of trigonal selenium and poly(N-vinylcarbazole) was prepared by ball milling 1.6 grams of trigonal selenium and 1.6 grams of poly(N-vinylcarbazole) in 14 milliliters each of tetrahydrofuran and toluene. Thereafter, 10 grams of the resulting slurry was then diluted with a solution of 0.25 gram of N,N-bis(biphenylyl)-3,5-dimethoxyaniline in 5 milliliters each of tetrahydrofuran and toluene. A 1.0 micron thick photogenerator layer was then fabricated by coating the above dispersion onto the adhesive layer on the Mylar substrate with a multiple-clearance film applicator, followed by drying in a forced air oven at 135° C. for 5 minutes. A solution of 1.0 gram of the above prepared charge transport polycarbonate (II) in 7 milliliters of methylene chloride was then coated over the photogenerator layer by means of a multiple-clearance film applicator. The resulting member was subsequently dried in a forced air oven at 130° C. for 30 minutes resulting in a 18 microns thick transport layer.

The fabricated imaging member was electrically tested by negatively charging it with a corona, and discharged by exposing to white light of wavelengths of from 400 to 700 nanometers. Charging was accomplished with a single wire corotron in which the wire was contained in a grounded aluminum channel and was strung between two insulating blocks. The acceptance potential of this imaging member after charging, and its residual potential after exposure were recorded. The procedure was repeated for different exposure energies supplied by a 75 watt Xenon arc lamp of incident radiation, and the exposure energy required to discharge the surface potential of the member to half of its original value was determined. This surface potential was measured using a wire loop probe contained in a shielded cylinder, and placed directly above the photoreceptor member surface. This loop was capacitively coupled to the photoreceptor surface so that the voltage of the wire loop corresponds to the surface potential. Also, the cylinder enclosing the wire loop was connected to the ground.

The above imaging member was negatively charged to a surface potential of 900 volts, and discharged to a residual potential of 100 volts. The dark decay of this device was about 30 volts/second. Further, the electrical properties of the above prepared photoresponsive imaging member remained essentially unchanged for 1,000 cycles of repeated charging and discharging.

EXAMPLE VI

A layered photoresponsive imaging member was fabricated by preparing a 0.5 micron thick layer of amorphous selenium on a ball grained aluminum plate of a thickness of 7 mils (175 microns) by conventional vacuum deposition techniques. Vacuum deposition was accomplished at a vacuum of $10^{-6}$ Torr, while the substrate was maintained at about 50° C. A hole transport layer in contact with and on top of the amorphous selenium layer was obtained by coating a solution of 1.0 gram of the above prepared polycarbonate (II) in 7 milliliters of methylene chloride using a multiple-clearance film applicator with a wet gap of 8 mils. Thereafter, the resulting imaging device was dried in a forced air oven at 40° C. for 1 hour to form a 20 microns thick transport layer. Subsequently, the imaging member was cooled to room temperture, followed by electrical testing by repeating the procedure of Example V with the exception that a 450 nanometer monochromatic light was selected for irradiation. Specifically, this imaging member was negatively charged to 850 volts and discharged to a residual potential of 80 volts. The dark decay of this device was 10 volts/second.

EXAMPLE VII

A layered photoresponsive imaging member was prepared by depositing a 0.5 micron thick layer of amorphous selenium on a ball grained aluminum plate of a thickness of 7 mils in accordance with the procedure of Example VI. A hole transport layer in contact with and on top of the amorphous selenium layer was obtained by coating a solution of 1 gram of the above prepared copolycarbonate (X) in 10 milliliters of methylene chloride by means of a multiple-clearance film applicator. Thereafter, the resulting device or imaging member was dried in a forced air oven at 40° C. for 1 hour to form a 15 microns thick transport layer. Subsequently, the imaging member was cooled to room temperature, followed by electrical testing by repeating the procedure of Example IV with the exception that a 450 nanometer monochromatic light was selected for irradiation. Specifically, this imaging member was negatively charged to 800 volts and discharged to a residual potential of 90 volts. The electrical performance of this imaging member remained essentially the same after 1,000 cycles of repeated charging and discharging.

EXAMPLE VIII

A photoresponsive device was prepared by coating a solution of 1 milliliter of 3-aminopropyltrimethoxysilane in 100 milliliters of ethanol onto a ball grained aluminum substrate. The coating was heated at 110° C. for 10 minutes resulting in the formation of a 0.1 micron thick polysilane layer. A dispersion of a photogenerator prepared by ball milling a mixture of 0.075 gram of vanadyl phthalocyanine pigment and 0.13 gram of Vitel PE-200 polyester (Goodyear) in 12 milliliters of methylene chloride for 24 hours was then coated on top of the polysilane layer. After drying the coating in a forced air oven at 135° C. for 6 minutes, a 0.5 micron thick phthalocyanine photogenerating layer was obtained.

A solution for the transport layer was prepared by dissolving 1.0 gram of the above prepared polycarbonate (II) in 8 milliliters of methylene chloride. This solution was then coated over the above photogenerator layer using a multiple-clearance film applicator. The resulting device was dried in a forced air oven at 135° C. for 30 minutes resulting in a 19 microns thick transport layer.

Electrical testing was carried out by repeating the procedure of Example V. Specifically, the above prepared imaging member was charged negatively to 950 volts and discharged with 830 nanometer monochromatic light to a residual potential of 70 volts. For this imaging device, the dark decay was less than 40 volts/second.

EXAMPLE IX

A layered photoresponsive imaging member with a transport layer of the above prepared polycarbonate (II) doped with N,N-bis(biphenylyl)-3,5-dimethoxyaniline, and a trigonal selenium photogenerator was prepared as follows:

An aluminized Mylar substrate of a thickness of 75 microns with a silane charge blocking layer, an adhesive layer, and a trigonal selenium photogenerating layer was prepared in accordance with the procedure of Example V. A solution for the hole transport layer was then prepared by dissolving 0.10 gram of N,N-bis(biphenylyl)-3,5-dimethoxyaniline and 1.0 gram of the above prepared polycarbonate (II) in 10 milliliters of methylene chloride. This solution was then coated over the photogenerator layer by means of a multiple-clearance film applicator. The resulting member was dried in a forced air oven at 130° C. for 30 minutes resulting in a 25 microns thick transport layer.

Electrical testing of the above prepared imaging member was then accomplished by repeating the procedure of Example V. Specifically, this imaging member was negatively charged to 1,100 volts and exposed to white light of wavelengths of 400 to 700 nanometers. The dark decay was less than 45 volts/second, and the device was discharged to about 50 volts. The electrical properties of this device remained substantially the same after 1,000 cycles of repeated charging and discharging.

Although the invention has been described with reference to specific preferred embodiments, it is not intended to be limited thereto, rather those skilled in the art will recognize variations and modifications may be made therein which are within the spirit of the invention and within the scope of the following claims.

What is claimed is:

1. A photoconductive imaging member comprised of a photogenerating layer, and a charge transport layer comprised of the N,N-bis(biarylyl)aniline charge transport polymers of the formula

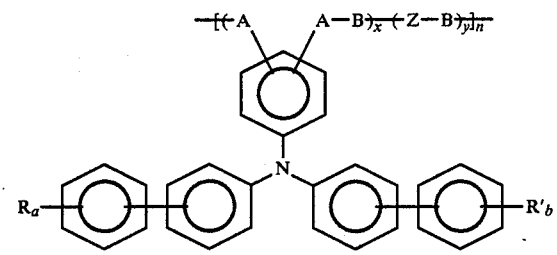

wherein A and B are independently selected from bifunctional linkages; Z is alkylenedioxy, arylenedioxy, or substituted derivatives thereof; R and R' are alkyl, aryl, alkoxy, aryloxy, or halogen; x and y are mole fractions wherein x is greater than 0 and the sum of x and y is equal to 1.0; a and b are the numbers 0, 1 or 2; and n represents the number of monomer units.

2. A photoconductive imaging member in accordance with claim 1 wherein A is —O—, and B is —COO—R''—OCO—, wherein R'' is alkylene, arylene, ether, or a polyether segment.

3. A photoconductive imaging member in accordance with claim 1 wherein A is —O—, and B is —CO—R''—CO—, wherein R'' is alkylene, arylene, ether, or a polyether segment.

4. A photoconductive imaging member in accordance with claim 1 wherein A is —O—, and B is —CONH—R''—NHCO—, wherein R'' is alkylene, arylene, ether, or polyether segment.

5. A photoconductive imaging member in accordance with claim 1 wherein y is 0 (zero).

6. A photoconductive imaging member in accordance with claim 1 wherein x is a mole fraction number of from 0.1 to about 1.0.

7. A photoconductive imaging member in accordance with claim 1 wherein y is 0 (zero).

8. A photoconductive imaging member in accordance with claim 1 wherein the charge transport layer is comprised of the polycarbonate (II), the polycarbonate (III), the polycarbonate (V), the polycarbonate (VI), the copolycarbonate (VIII), the copolycarbonate (X), the polyester (IV), the polyester (VII), the polyurethane (IX), or the polyurethane (XI), wherein n represents the number of monomer units.

9. A photoconductive imaging member in accordance with claim 1 wherein R and R' are aryl of from 6 to about 24 carbon atoms.

10. A photoconductive imaging member in accordance with claim 1 wherein R and R' are alkyl of from 1 to about 20 carbon atoms.

11. A photoconductive imaging member in accordance with claim 1 wherein R and R' are alkoxy functions of from 1 to about 20 carbon atoms, or halogen.

12. A photoconductive imaging member in accordance with claim 1 wherein a and b are equal to 0 (zero).

13. A photoconductive imaging member in accordance with claim 1 wherein R or R' is methyl or methoxy groups.

14. A photoconductive imaging member in accordance with claim 1 wherein n is from about 10 to about 350.

15. A photoconductive imaging member in accordance with claim 1 wherein x is 1.

16. A photoconductive imaging member in accordance with claim 1 containing a supporting substrate.

17. A photoconductive imaging member in accordance with claim 1 wherein the photogenerating layer is comprised of inorganic, or organic photoconductive pigments.

18. A photoconductive imaging member in accordance with claim 17 wherein the photogenerating layer is comprised of selenium, selenium alloys, trigonal selenium, a vanadyl phthalocyanine, squaraine, perylene, metal free phthalocyanines, metal phthalocyanines, or dibromoanthanthrone photoconductive pigments.

19. A photoconductive imaging member in accordance with claim 1 wherein the photogenerating layer is situated between a supporting substrate and the charge transport layer.

20. A photoconductive imaging member in accordance with claim 1 wherein the charge transport layer is situated between the photogenerating layer and the supporting substrate.

21. A photoconductive imaging member in accordance with claim 19 wherein the supporting substrate is comprised of a conductive component on an organic polymeric composition.

22. A photoconductive imaging member in accordance with claim 1 wherein the photogenerating pigments are dispersed in a resinous binder in an amount of from about 5 percent by weight to about 95 percent by weight.

23. A photoconductive imaging member in accordance with claim 22 wherein the resinous binder is a polyester, polyvinyl butyral, a polycarbonate, or polyvinyl formal.

24. A photoconductive imaging member in accordance with claim 1 containing a metal oxide charge blocking layer and an adhesive layer.

25. A photoconductive imaging member in accordance with claim 1 containing a polysilane charge blocking layer and an adhesive layer.

26. A photoconductive imaging member in accordance with claim 1 wherein the polymer charge transport layer is doped with a hole transport molecule in an amount of from about 1 percent by weight to about 20 percent by weight.

27. A method of imaging which comprises generating an electrostatic image on the imaging member of claim 1, subsequently transferring this image to a suitable substrate; and thereafter permanently affixing the image thereto.

28. A method of imaging which comprises generating an electrostatic image on the imaging member of claim 8; subsequently transferring this image to a suitable substrate; and thereafter permanently affixing the image thereto.

29. A polymer in accordance with claim 28 comprised of the polycarbonate (II), the polycarbonate (III), the polycarbonate (V), the polycarbonate (VI), the copolycarbonate (VIII), the copolycarbonate (X), the polyester (IV), the polyester (VII), the polyurethane (IX), and the polyurethane (XI), wherein n represents the number of monomer units.

30. A polymer in accordance with claim 28 wherein n is a number of from 10 to about 350.

* * * * *